United States Patent [19]
Underwood et al.

[11] Patent Number: 5,508,594
[45] Date of Patent: Apr. 16, 1996

[54] ELECTRIC VEHICLE CHASSIS CONTROLLER

[75] Inventors: Thomas C. Underwood, Laurel; Beth A. Herman, Columbia; Eric L. Mohler, Annapolis, all of Md.

[73] Assignee: Westinghouse Electric Corp, Pittsburgh, Pa.

[21] Appl. No.: 258,628

[22] Filed: Jun. 10, 1994

[51] Int. Cl.$^6$ .............................. H02P 7/06; B60K 41/28
[52] U.S. Cl. ...................... 318/139; 318/432; 388/809; 388/907.5
[58] Field of Search .................... 318/139, 494, 318/504, 432, 433; 388/809, 816, 907.5; 180/65.1, 65.8; 320/2, 9, 10, 30, 31, 32, 35, 39; 364/424.01

[56] References Cited

U.S. PATENT DOCUMENTS

| | | |
|---|---|---|
| 4,008,243 | 2/1977 | Christianson et al. . |
| 4,170,750 | 10/1979 | Joyes . |
| 4,199,037 | 4/1980 | White . |
| 4,500,820 | 2/1985 | Noto et al. . |
| 4,629,043 | 12/1986 | Matsuo et al. . |
| 4,730,151 | 3/1988 | Florey et al. . |
| 4,928,227 | 5/1990 | Burba et al. . |
| 5,148,883 | 9/1992 | Tanaka et al. . |

OTHER PUBLICATIONS

Takeichi Sakurai et al. "R&D activities on electric vehicles in TEPCO" Presented Proceedings EVS–11 Sep. 30, 1993 Florence, Italy—see p. 3; FIG. 5.

*Primary Examiner*—Bentsu Ro

[57] ABSTRACT

A vehicle power controller for a vehicle including a motor that drives the vehicle, a plurality of sensors and a motor controller, wherein the plurality of sensors includes an accelerator sensor for sensing a position of an accelerator pedal and a brake sensor for sensing a position of a brake pedal, and wherein the motor controller controls torque output of the motor. The vehicle power controller includes three components. The first receives signals from the accelerator sensor and the brake sensor. The second converts the signals for the accelerator sensor and the brake sensor into a torque value, and the third outputs the torque value to the motor controller for controlling the torque output of the motor.

36 Claims, 12 Drawing Sheets

ELECTRIC VEHICLE CHASSIS CONTROLLER

RELATED APPLICATIONS

The following identified U.S. patent applications are filed on the same date as the instant application and are relied upon and incorporated by reference in this application.

U.S. patent application entitled "Flat Topping Concept", Ser. No. 08/258,295, and filed on the same date herewith, now U.S. Pat. No. 5,475,581, issued Dec. 12, 1995;

U.S. patent application entitled "Electric Induction Motor And Related Method Of Cooling", Ser. No. 08/442,708, and filed on May 18, 1995;

U.S. patent application entitled "Automotive 12 Volt System For Electric Vehicles", Ser. No. 08./258,142, and filed on the same date herewith;

U.S. patent application entitled "Direct Cooled Switching Module For Electric Vehicle Propulsion System", Ser. No. 08/258,027, and filed on the same date herewith;

U.S. patent application entitled "Electric Vehicle Propulsion System", Ser. No. 08/258,301, and filed on the same date herewith;

U.S. patent application entitled "Speed Control and Bootstrap Technique For High Voltage Motor Control", Ser. No. 08/258,294, and filed on the same date herewith;

U.S. patent application entitled "Vector Control Board For An Electric Vehicle Propulsion System Motor Controller", Ser. No. 08/258,306, and filed on the same date herewith;

U.S. patent application entitled "Digital Pulse Width Modulator With Integrated Test And Control", Ser. No. 08/258,305, and filed on the same date herewith;

U.S. patent application entitled "Control Mechanism For Electric Vehicle", Ser. No. 08/258,149, and filed on the same date herewith, now U.S. Pat. No. 5,463,294, issued Oct. 31, 1995;

U.S. patent application entitled "Improved EMI Filter Topology for Power Inverters", Ser. No. 08/258,153, and filed on the same date herewith;

U.S. patent application entitled "Fault Detection Circuit For Sensing Leakage Currents Between Power Source And Chassis", Ser. No. 08/258,179, and filed on the same date herewith now U.S. Pat. No. 5,481,194, issued Jan. 2, 1996;

U.S. patent application entitled "Electric Vehicle Relay Assembly", Ser. No. 08/258,117, and filed on the same date herewith;

U.S. patent application entitled "Three Phase Power Bridge Assembly", Ser. No. 08/258,033, and filed on the same date herewith;

U.S. patent application entitled "Electric Vehicle Propulsion System Power Bridge With Built-In Test", Ser. No. 08/258,034, and filed on the same date herewith;

U.S. patent application entitled "Method For Testing A Power Bridge For An Electric Vehicle Propulsion System", Ser. No. 08/258,178, and filed on the same date herewith;

U.S. patent application entitled "Electric Vehicle Power Distribution Module", Ser. No. 08/258,157, and filed on the same date herewith;

U.S. patent application entitled "Electric Vehicle System Control Unit Housing", Ser. No. 08/258,156, and filed on the same date herewith;

U.S. patent application entitled "Low Cost Fluid Cooled Housing For Electric Vehicle System Control Unit", Ser. No. 08/258,299, and filed on the same date herewith;

U.S. patent application entitled "Electric Vehicle Coolant Pump Assembly", Ser. No. 08/258,296, and filed on the same date herewith;

U.S. patent application entitled "Heat Dissipating Transformer Coil", Ser. No. 08/258,141, and filed on the same date herewith, now U.S. Pat. No. 5,469,124, issued Nov. 21, 1995;

U.S. patent application entitled "Electric Vehicle Battery Charger", Ser. No. 08/258,154, and filed on the same date herewith.

BACKGROUND OF THE INVENTION

1. Field of the Invention

The present invention relates to an electric vehicle propulsion system. More particularly, this invention relates to systems for controlling propulsion of electric vehicles and to fail safe systems for communicating between digital and analog sensors or other instrumentation in electric vehicles and the motor used to generate power for vehicle propulsion.

2. Description of the Related Art

For an electric vehicle to be commercially viable, its cost and performance should be competitive with that of its gasoline-powered counterparts. Moreover, for the components of an electric vehicle, or any vehicle, to be competitively priced, they must be interchangeable among different vehicle platforms. Interchangeable components can be mass produced and marketed at low costs in comparison to components specially manufactured for a single or a small number of vehicle platforms.

In the past, manufacturers have focused on a number of issues concerning the manufacture of electric vehicles, most of which concerned the propulsion system and methods of emulating the propulsion system on vehicles powered by combustion engines. They failed to address issues such as portability of the components used in electric vehicles, and particularly, the components used in the propulsion system of electric vehicles.

Because electric vehicles do not rely on combustion engines, but rather use batteries and electric motors for power, the components of a controller for the batteries and electric motors are suitable for interchangeability among different vehicle platforms. In the past, however, little attention was paid to the portability and interchangeability of these components.

Furthermore, little attention has been paid to development of controllers for propulsion systems of electric vehicles that incorporate simple interfaces to provide flexibility in using the controllers on different vehicle platforms with minimum modifications to the system hardware and software.

SUMMARY OF THE INVENTION

Accordingly, the present invention is directed to a controller that obviates one or more of the problems due to the limitations and disadvantages of the related art.

Features and advantages of the invention will be set forth in the description which follows, and in part will be apparent from the description, or may be learned by practice of the invention. The objectives and other advantages of the invention will be realized and attained by the method and apparatus particularly pointed out in the written description and claims thereof as well as the appended drawings.

To achieve these and other advantages and in accordance with the purpose of the invention, as embodied and broadly described, the invention provides for a vehicle power controller for a vehicle including a motor that drives the vehicle, a plurality of sensors, and a motor controller which controls torque output of the motor. The plurality of sensors includes an accelerator sensor for sensing a position of an accelerator pedal and a brake sensor for sensing a position of a brake pedal. The vehicle power controller includes three components. The first receives signals from the accelerator sensor and the brake sensor; the second converts the signals for the accelerator sensor and the brake sensor into a torque value, and the third outputs the torque value to the motor controller for controlling the torque output of the motor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate a presently preferred embodiment of the invention and, together with the description, serve to explain the principles of the invention. In the drawings.

DESCRIPTION OF THE PREFERRED EMBODIMENT

Reference will now be made in detail to the preferred embodiment of the present invention as illustrated in the accompanying drawings. Whereever possible, the same reference numbers will be used throughout the drawings and the following description to refer to the same or like parts.

Figure 1:
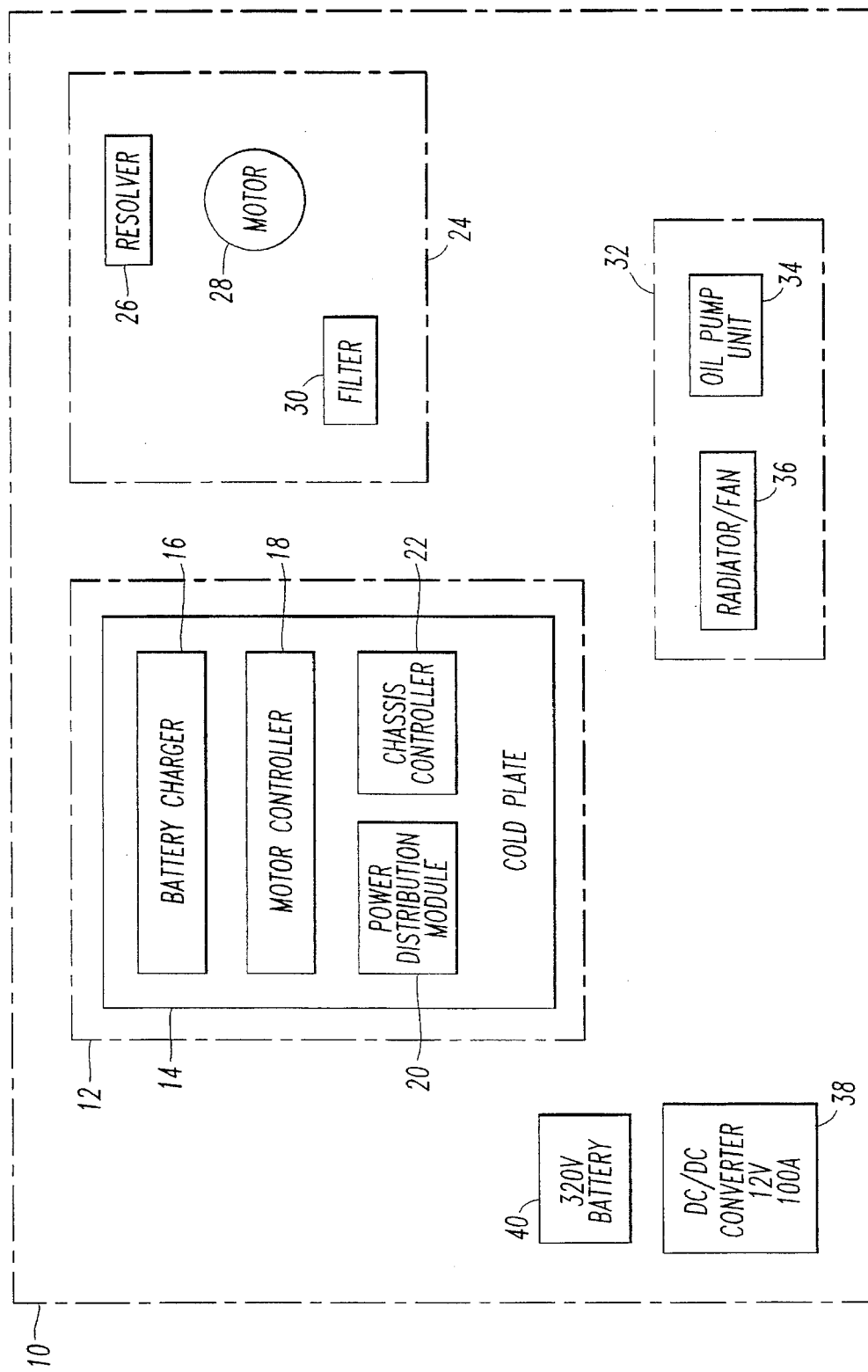
FIG. 1 is a block diagram of an electric vehicle propulsion system in which the preferred embodiment of the invention may be used.

As shown in FIG. 1, there is provided an electric vehicle propulsion system 10 comprising a system control unit 12, a motor assembly 24, a cooling system 32, a battery 40, and a DC/DC converter 38. The system control unit 12 includes a cold plate 14, a battery charger 16, a motor controller 18, a power distribution module 20, and a chassis controller 22. The motor assembly 24 includes a resolver 26, a motor 28, and a filter 30. The cooling system 32 includes an oil pump unit 34 and a radiator/fan 36.

Figure 2:
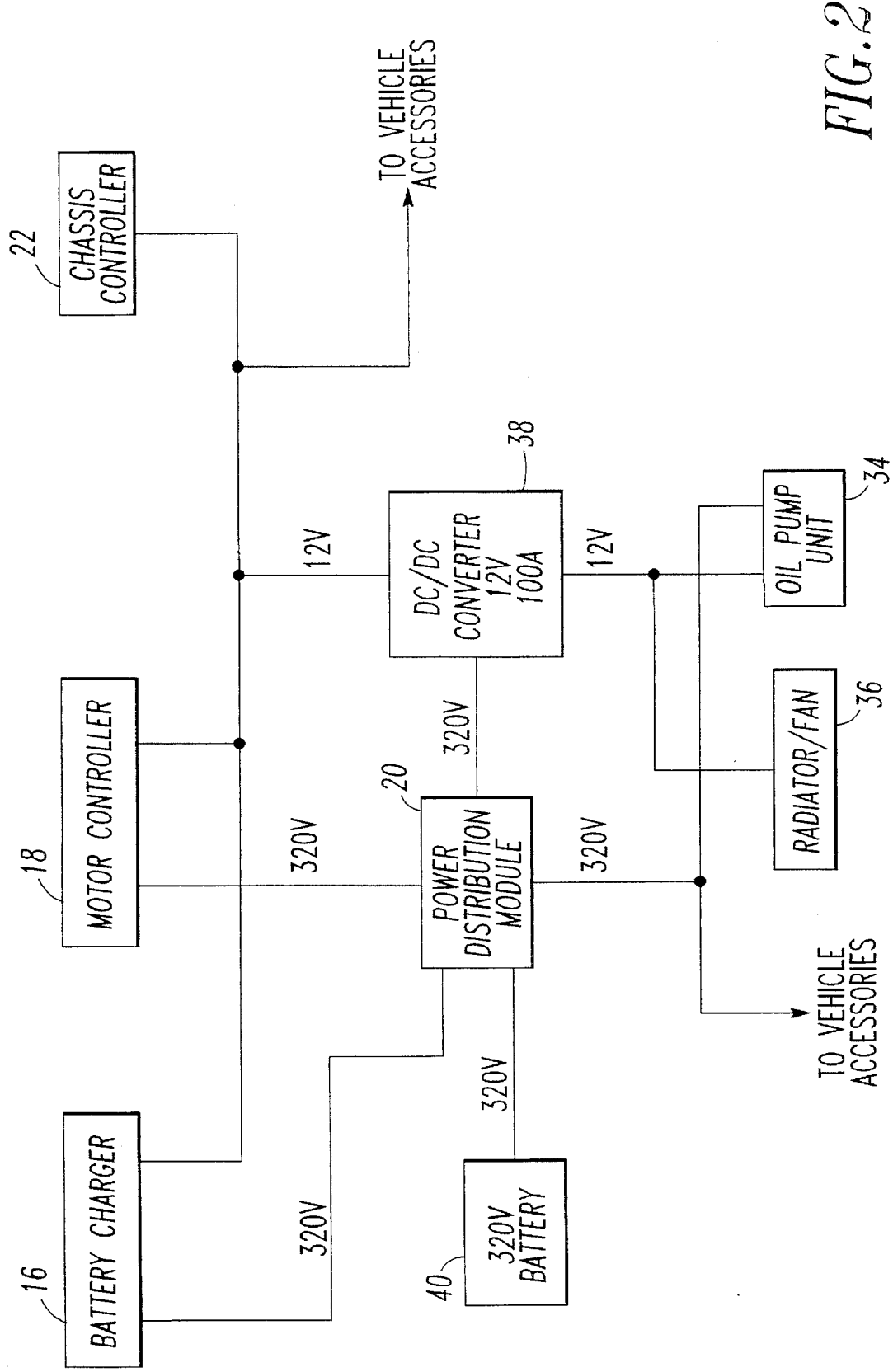
FIG. 2 is a power distribution diagram of the electric vehicle propulsion system of FIG. 1.

FIG. 2 is a power distribution diagram of the electric vehicle propulsion system 10. As shown in FIG. 2, the battery 40 serves as the primary source of power for the electric propulsion system 10. The battery 40 comprises, for example, a sealed lead acid battery, a monopolar lithium metal sulfide battery, a bipolar lithium metal sulfide battery, or the like, for providing a 320 volt output. Preferably, the electric propulsion system 10 works over a wide voltage range, e.g., 120 volts to 400 volts, to accommodate changes in the output voltage of the battery 40 due to load or depth of discharge. However, the electric vehicle propulsion system 10 is preferably optimized for nominal battery voltages of about 320 volts.

The power distribution module 20 is coupled to the output of the battery 40 and includes, among other things, fuses, wiring, and connectors for distributing the 320 volt output from the battery 40 to various components of the electric vehicle propulsion system 10. For example, the power distribution module 20 distributes the 320 volt output from the battery 40 to the motor controller 18, the DC/DC converter 38, the oil pump unit 34, and the battery charger 16. The power distribution module 20 also distributes the 320 volt output from the battery 40 to various vehicle accessories, which are external to the electric vehicle propulsion system 10. These vehicle accessories include, for example, an air conditioning system, a heating system, a power steering system, and any other accessories that may require a 320 volt power supply. Additional details concerning the power distribution module 20 are disclosed in copending U.S. patent application Ser. No. 08/258,457 (Westinghouse Case No. 58,346) entitled "ELECTRIC VEHICLE POWER DISTRIBUTION ASSEMBLY" filed on the same day as this application.

The DC/DC converter 38, which, as described above, is coupled to the 320 volt output of the power distribution module 20, converts the 320 volt output of the power distribution module 20 to 12 volts. The DC/DC converter 38 then supplies its 12 volt output as operating power to the battery charger 16, the motor controller 18, the chassis controller 22, the oil pump unit 34, and the radiator/fan 36. The DC/DC converter 38 also supplies its 12 volt output as operating power to various vehicle accessories, which are external to the electric vehicle propulsion system 10. These vehicle accessories include, for example, vehicle lighting, an audio system, and any other accessories that may require a 12 volt power supply. It should be appreciated that the DC/DC converter 38 eliminates the need for a separate 12 volt storage battery. Additional details concerning the DC/DC converter 38 are disclosed in copending U.S. patent application Ser. No. 08/258,142 (Westinghouse Case No. 58,333) entitled "AUTOMOTIVE 12 VOLT SYSTEM FOR ELECTRIC VEHICLES" and U.S. patent application Ser. No. 08/258,157 (Westinghouse Case No. 58,351) entitled "HEAT DISSIPATING TRANSFORMER COIL" filed on the same day as this application.

Figure 3:
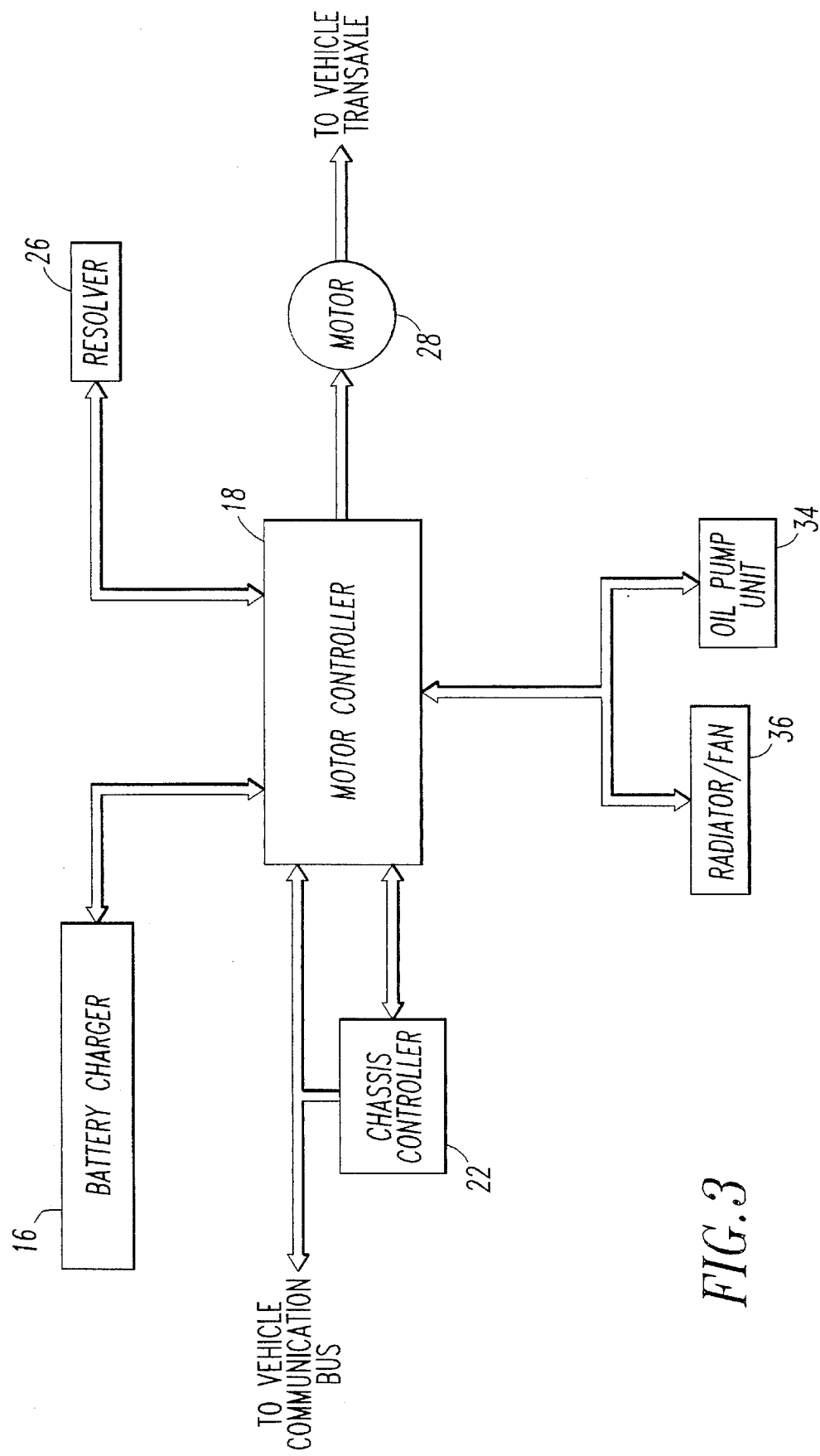
FIG. 3 is a functional diagram of the electric vehicle propulsion system of FIG. 1.
Figure 4:
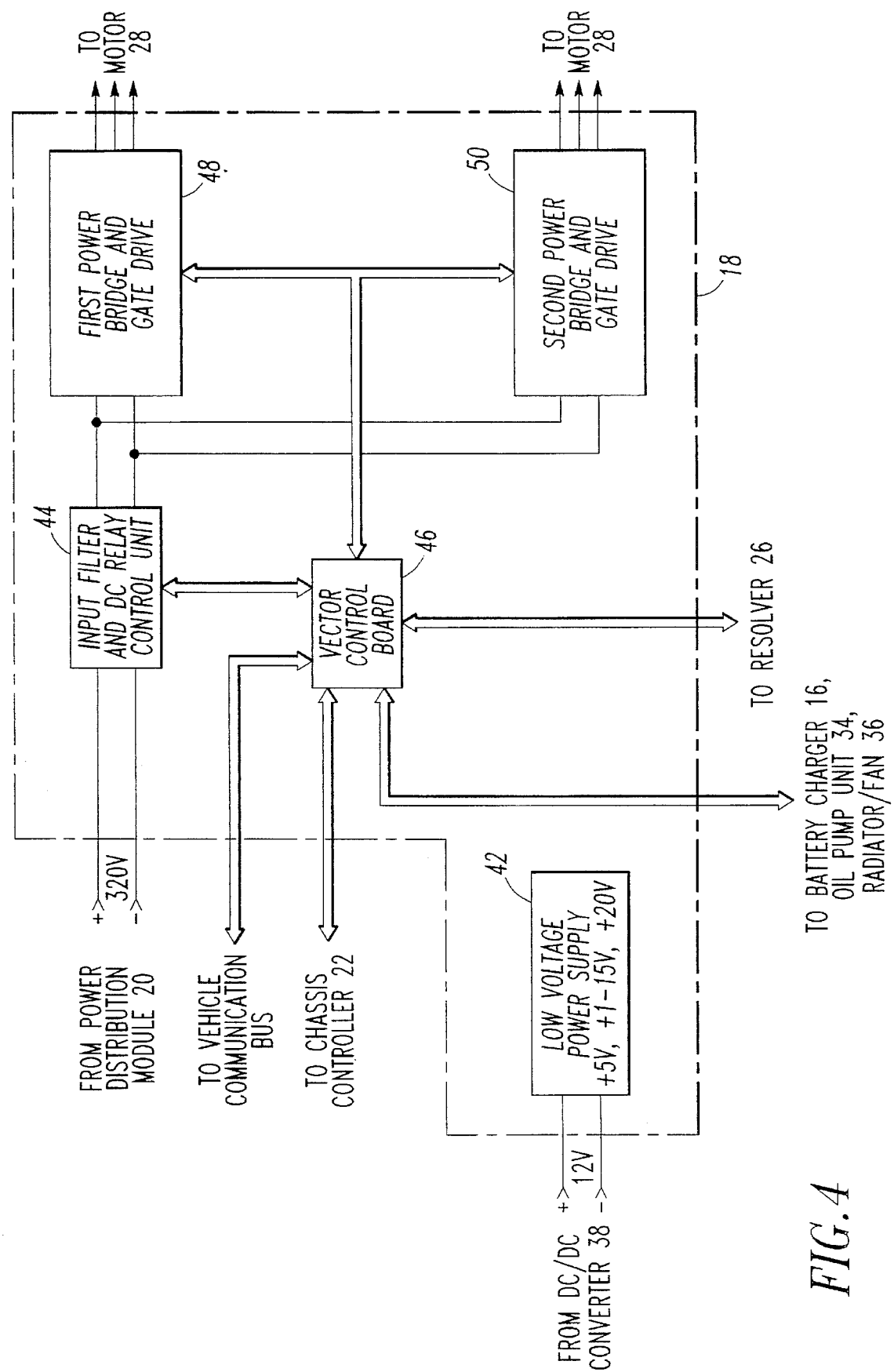
FIG. 4 is a functional diagram of the motor controller of the electric vehicle propulsion system of FIG. 1.
Figure 5:
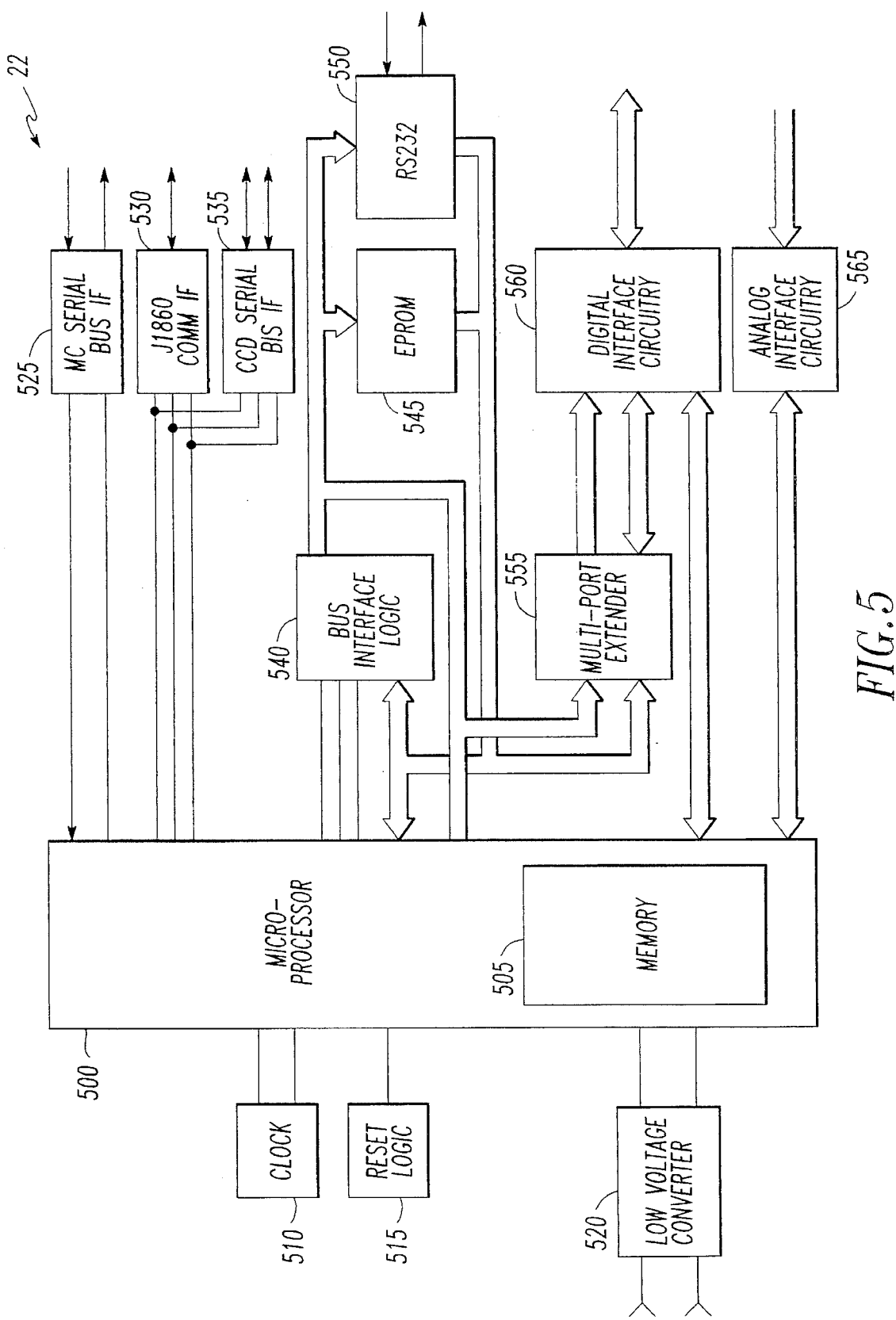
FIG. 5 is a block diagram of the chassis controller of FIGS. 1–3.

As shown in FIGS. 3 and 4, the components of the electric vehicle propulsion system 10 are interconnected via various data busses. The data busses can be of the electrical, optical, or electro-optical type as is known in the art. Operation of the electric vehicle propulsion system 10 will now be described with reference to FIGS. 3 and 4.

The battery charger 16 receives command signals from and sends status signals to the motor controller 18 for charging the battery 40. The battery charger 16 provides a controlled battery charging current from an external AC power source (not shown). Preferably, AC current is drawn from the external source at near-unity power factor and low harmonic distortion in compliance with expected future power quality standards. Further, the battery charger 16 is preferably designed to be compatible with standard ground fault current interrupters and single-phase power normally found at residential locations. Additional details concerning the battery charger 16 are disclosed in copending U.S. patent application Ser. No. 08/258,154 (Westinghouse Case No. 58,352) entitled "ELECTRIC VEHICLE BATTERY CHARGER" filed on the same day as this application.

The oil pump unit 34 and radiator/fan 36 also receive command signals from and send status signals to the motor controller 18. As will be described in more detail below, the oil pump unit 34 and radiator/fan 36 are part of a closed loop oil cooling system for the electric vehicle propulsion system 10. Additional details concerning the oil pump unit 34 and radiator/fan 36 are disclosed in copending U.S. patent application Ser. No. 08/258,296 (Westinghouse Case No. 58,350) entitled "ELECTRIC VEHICLE COOLANT OIL PUMP" and copending U.S. patent application Ser. No. 08/258,294 (Westinghouse Case No. 58,336) entitled "SPEED CONTROL AND BOOTSTRAPPING TECHNIQUE" filed on the same day as this application.

As shown in FIG. 6A, the motor 28 is a 3-phase AC induction motor having two identical, electrically isolated, windings per phase (windings A1 and A2 are for the "A" phase, windings B1 and B2 are for the "B" phase, and windings C1 and C2 are for the "C" phase) for producing high torque at zero speed to provide performance comparable to conventional gas-driven engines. The rotor (not shown) of the motor 28 is coupled to the vehicle transaxle (not shown). Preferably, the two windings in each phase of the motor 28 are aligned substantially on top of one another and are electrically in phase such that each winding provides approximately half the total power of the phase. Also the motor 28 is preferably completely sealed and utilizes spray-oil cooling to remove heat directly from the rotor and end windings to increase reliability. Additional details concerning the motor 28 are disclosed in copending U.S. patent application Ser. No. 08/258,150 (Westinghouse Case No. 58,332) entitled "ELECTRIC VEHICLE MOTOR AND RELATED METHOD OF COOLING" filed on the same day as this application.

The resolver 26 is illustrated in FIG. 6B and is positioned proximate to the motor 28 for detecting the angular position of the motor shaft and for providing signals indicative of the angular position of the motor shaft to the motor controller 18. The reference signal line $R_1$ connected to the resolver is for a positive or negative reference value indicating the angular position of the motor shaft. The $S_1$ signal line from the resolver provides a positive or negative sine value for the angular position of the motor shaft and the $S_2$ signal line from the resolver provides a positive or negative cosine value for the angular position of the motor shaft.

The resolver 26 can comprise a commercially available resolver or other resolver known in the art. Reference signals for the resolver 26 are provided by the motor controller 18.

The chassis controller 22 and the motor controller 18 receive signals from a vehicle communication bus. Generally, the vehicle communication bus serves as a communication pathway for interfacing various vehicle sensors and controllers to the chassis controller 22 and the motor controller 18, as will be explained in more detail below.

The chassis controller 22 comprises a microprocessor-based digital and analog electronics system and provides control and status interfacing to the vehicle's sensors and controllers and to the motor controller 18. For example, the chassis controller 22 is connected, via the vehicle communication bus, to the vehicle key switch, accelerator, brake, and drive selector switches. The chassis controller 22 interprets signals from these switches to provide the motor controller 18 with start-up, drive mode (e.g., forward, reverse, and neutral), motor torque, regenerative braking, shutdown, and built-in test (BIT) commands. Preferably, the chassis controller 22 communicates with the motor controller 18 via an opto-coupled serial data interface and receives status signals from the motor controller 18 of all the commands sent to verify the communication links between the chassis controller 22, the vehicle, and the motor controller 18 and to verify that the vehicle is operating properly. It should be appreciated that because the chassis controller 22 provides the control and status interfacing to the vehicle's sensors and controllers and to the motor controller 18, the electric vehicle propulsion system 10 can be modified for use with any number of different vehicles simply by modifying the chassis controller 22 for a particular vehicle.

The chassis controller 22 also provides battery management capabilities by using signals received over the vehicle communication bus from a battery current sensor located in the power distribution module 20. The chassis controller 22 interprets signals from the battery current sensor, provides charging commands to the motor controller 18, and sends a state-of-charge value to a "fuel" gauge on the vehicle dashboard. The chassis controller 22 further connects, via the vehicle communication bus, to vehicle controllers including odometer, speedometer, lighting, diagnostic and emissions controllers, as well as to an RS-232 interface for system development. Additional details concerning the chassis controller 22 are disclosed in copending U.S. patent application Ser. No. 08/258,628 (Westinghouse Case No. 58,347) entitled "ELECTRIC VEHICLE CHASSIS CONTROLLER" filed on the same day as this application and which is hereby expressly incorporated by reference into this application.

As shown in FIG. 4, the motor controller 18 includes a low voltage power supply 42, an input filter and DC relay control unit 44, a vector control board 46, and first and second power bridges and gate drives 48 and 50, respectively.

The low voltage power supply 42 converts the 12 volt output from the DC/DC converter 38 to provide +5 V, ±15 V, and +20 V outputs to the input filter and DC relay control unit 44, the vector control board 46, the first power bridge 48, and the second power bridge 50. The low voltage power supply 42 can comprise a commercially available power supply as is known in the art.

The input filter and DC relay control unit 44 includes electrical connections for coupling the 320 volt output of the power distribution module 20 to the first and second power bridges 48 and 50, respectively. The input filter and DC relay control unit 44 includes EMI filtering, a relay circuit for disconnecting the coupling of the 320 volt output of the power distribution module 20 to the first and second power bridges 48 and 50, respectively, and various BIT circuits including voltage sense circuits and a chassis ground fault circuit. Preferably, the input filter and DC relay control unit 44 receives control signals from and sends status signals, e.g., BIT signals, to the vector control board 46. Additional details concerning the input filter and DC relay control unit 44 are disclosed in copending U.S. patent application Ser. No. 08/258,153 (Westinghouse Case No. 58,340) entitled "IMPROVED EMI FILTER TOPOLOGY FOR POWER INVERTER;" copending U.S. patent application Ser. No. 08/258,179 (Westinghouse Case No. 58,341) entitled "FAULT DETECTION CIRCUIT TO SENSE LEAK CURRENTS;" and copending U.S. patent application Ser. No. 08/258,117 (Westinghouse Case No. 58,342) entitled "ELECTRIC VEHICLE RELAY ASSEMBLY" filed on the same day as this application.

Each of the first and second power bridges 48 and 50, respectively, includes insulated gate bipolar transistor (IGBT) switching circuits and associated gate drive circuits for applying drive currents to each of the windings of the motor 28. Preferably, each of the first and second power bridges 48 and 50, respectively, provides half the current to the windings of the motor 28, thereby allowing the use of readily available, low cost IGBT switching circuits. The first and second power bridges 48 and 50, respectively, receive control signals from and send status signals, e.g., BIT signals, to the vector control board 46. Additional details concerning the first and second power bridges 48 and 50, respectively, are disclosed in copending U.S. patent application Ser. No. 08/258,033 (Westinghouse Case No. 58,343) entitled "THREE PHASE POWER BRIDGE INTERCONNECT;" copending U.S. patent application Ser. No. 08/258,034 (Westinghouse Case No. 58,344) entitled "ELECTRIC VEHICLE PROPULSION SYSTEM POWER BRIDGE WITH BUILT-IN TEST;" and copending U.S. patent application Ser. No. 08/258,178 (Westinghouse Case No. 58,345) entitled "METHOD FOR TESTING A POWER BRIDGE FOR AN ELECTRIC VEHICLE PROPULSION SYSTEM" filed on the same day as this application.

The vector control board 46 comprises a microprocessor based digital and analog electronics system. As its primary function, the vector control board 46 receives driver-initiated acceleration and braking requests from the chassis controller 22. The vector control board 46 then acquires rotor position measurements from the resolver 26 and current measurements from the first and second power bridges 48 and 50, respectively, and uses these measurements to generate pulse width modulated (PWM) voltage waveforms for driving the first and second power bridges 48 and 50, respectively, to produce the desired acceleration or braking effects in the motor 28. The PWM voltage waveforms are generated in accordance with a control program which is designed to result in a requested torque output. As described above, the vector control board 46 also has the function of controlling the input filter and DC relay control unit 44, the oil pump unit 34, the radiator/fan 36, the battery charger 16, the input filter and DC relay control unit 44, built in test circuitry, vehicle communication, and fault detection. Additional details concerning the vector control board 46 are disclosed in copending U.S. patent application Ser. No. 08/258,295 (Westinghouse Case No. 58,295) entitled "FLAT TOPPING CIRCUIT;" copending U.S. patent application Ser. No. 08/258,306 (Westinghouse Case No. 58,337) entitled "VECTOR CONTROL BOARD FOR AN ELECTRIC VEHICLE PROPULSION SYSTEM MOTOR CONTROLLER"; copending U.S. patent application Ser. No. 08/258,305 (Westinghouse Case No. 58,338) entitled "DIGITAL PULSE WIDTH MODULATOR;" copending U.S. patent application Ser. No. 08/258,027 (Westinghouse Case No. 58,334) entitled "DIRECT COOLED IGBT MODULE;" and copending U.S. patent application Ser. No. 08/258,149 (Westinghouse Case No. 58,339) entitled "CONTROL MECHANISM FOR ELECTRIC VEHICLE" filed on the same day as this application. Additional details concerning the vector control board 46 are also disclosed in U.S. Pat. No. 5,291,388 entitled "RECONFIGURABLE INVERTER APPARATUS FOR BATTERY-POWERED VEHICLE DRIVE" issued on Mar. 1, 1994; U.S. Pat. No. 5,182,508 entitled "RECONFIGURABLE AC INDUCTION MOTOR DRIVE FOR A BATTERY-POWERED VEHICLE" issued on Jan. 26, 1993; U.S. Pat. No. 5,168,204 entitled "AUTOMATIC MOTOR TORQUE AND FLUX CONTROLLER FOR BATTERY-POWERED VEHICLE DRIVE" issued on Dec. 1, 1992; and U.S. Pat. No. 5,227,963 entitled "FLAT-TOP WAVEFORM GENERATOR AND PULSE-WIDTH MODULATOR USING SAME" issued on Jul. 13, 1993, which are hereby expressly incorporated by reference into this application.

Referring to FIGS. 5–14, the structure and operations of the chassis controller 22 in accordance with a preferred embodiment of the invention will now be explained in detail. At the heart of the chassis controller 22 is a microprocessor 500 that includes a memory 505 for storing, for example, program instructions and other data associated with the operation of the chassis controller 22. The microprocessor 500 is preferably a 68HC11 microcontroller manufactured by Motorola Corporation; however, other comparable devices may be used.

A portion of the memory 505 is a electronically erasable programmable read-only memory (EEPROM), while another portion is comprised of a read-only memory (ROM) and random-access memory (RAM). The read-write limitations of the EEPROM, RAM and ROM are well known. For purposes of this description it is useful to note that the EEPROM can only be written to a limited number of times.

As explained below, the program instructions in memory 505 include the chassis controller software. The chassis controller software is comprised of a control processing component 600 (FIG. 6) with a state-of-charge subcomponent 1400 (FIG. 14), an analog-to-digital interface processing component 700 (FIG. 7), a mode processing component 800 (FIG. 8), BIT mode processing component 900 (FIG. 9), drive mode processing component 1000 with an odometer and speedometer processing subcomponent 1075 (FIGS. 10–12), and a charge mode processing component 1300 (FIG. 13).

The microprocessor 500 is connected, directly or indirectly, to the following components on the chassis controller 22: a clock 510, a reset logic 515, a low voltage converter 520, a MC serial bus 525, a J1850 communications interface 530, a CCD serial bus 535, a bus interface logic 540, a EPROM 545, a RS232 connector 550, a multiport extender 555, a digital interface circuitry 560, and a analog interface circuitry 565.

The clock 510 provides timing signals to the microprocessor 500 and the reset logic 515 initializes the microprocessor 500 when power is first supplied by the low voltage converter 520 to the microprocessor 500. The reset logic 515 sends an initial pulse to the microprocessor 500 for this purpose. The low voltage converter 520 converts 12 V power from the DC/DC Converter 38 to +5 and ±15 volts to power the microprocessor 500 and the other components of the chassis controller 22.

The MC serial bus interface (IF) 525 is an opto-coupled serial data bus interface connecting the microprocessor 500 to the vector control board 46 of the motor controller 18 for sending commands to the vector control board 46 and receiving status or other data signals from the vector control board 46. The status data indicates receipt of the commands and verifies the communication link. As explained above, the commands sent to the vector control board 46 include start-up, drive mode (e.g. forward, reverse, neutral), motor torque, regenerative braking, shutdown, and BIT commands. If communication with the motor controller 18 is lost during operation, the chassis controller 22 can shut down the motor controller 18 through an opto-coupled switch in the interface 525.

The chassis controller includes two multiplexed serial bus interfaces that connect to the vehicle communication bus. The J1850 communications interface 530 is for connecting the microprocessor 500 to a portion of the vehicle communications, that is, a society of Architecture Engineers SAE standard bus, used to communicate diagnostic and emissions information to the vehicle. The J1850 communications interface 530 is also used for general purpose communications on vehicles manufactured, for example, by General Motors Corporation, U.S.A. Because different manufacturers use different vehicle busses and related protocols, the chassis controller 22 also includes a CCD (Chrysler Collision Detection) serial bus interface 535 that connects the microprocessor 500 to a differential serial bus used in vehicles manufactured by Chrysler Corporation, U.S.A. The information communicated to a portion of the vehicle communication bus, either an SAE standard bus or differential serial bus, through these bus interfaces 530 and 535 includes battery state-of-charge, odometer value, speedometer value, status light commands for gauges in the vehicle, and diagnostic information.

The bus interface logic 540 facilitates communication of both address information and data between the microprocessor 500 and an external device (not shown) connected to the RS232 connector 550. The EPROM 545 and RS232 connector 550 are standard, well known components. The EPROM 545 is optional and may be used to store additional program instructions used by the microprocessor 500 to perform functions of the chassis controller 22. The RS232 connector 550 is included in the chassis controller 22 for connecting the microprocessor 500 to external diagnostic systems that are not part of the present invention.

The microprocessor 500 only includes five data ports for receiving data from and connecting to external components. One such data port is used to connect the bus interface logic 540 to the microprocessor 500. The multiport extender 555 is included in the chassis controller 22 to extend the number of data ports and connect additional components to the microprocessor 500. The microprocessor 500 receives data for the following digital signal inputs via the digital interface circuitry 560 and multiport extender 555: key switch signal, drive selector signal (PRND), charger-connected signal, and charge-mode signal. The microprocessor 500 also sends data for emergency shutoff and LED/RELAY signals to the vehicle through the multiport extender 555 and digital interface circuitry 560.

Finally, the microprocessor 500 receives data for certain analog signals from the vehicle, via the analog interface circuitry 565. These signals, which are redundant for fault detection, include: accelerator position signals, brake pressure signals, battery current signals, and built-in-test (BIT) signals.

As explained briefly above, the chassis controller 22 also provides BEM capabilities. The chassis controller 22 receives the battery current signals from a battery current sensor of the vehicle (via the analog interface circuitry 565) to determine the state-of-charge of the battery 40. The state-of-charge value is sent to the "fuel" gauge on the dashboard via one of the interfaces 530 or 535, depending on the type of vehicle the controller 22 is being used with. As explained fully below, the state-of-charge value is also used to limit regenerative braking, that is, when power output from the motor 28 is used to charge the battery 40. The chassis controller 22 controls slow-charging of the battery 40 by sending commands to the motor controller 18 via the MC serial bus interface 525. There are two inputs to control charging, the first of which is to put the chassis controller in the charge mode. This may be indicated by, for example, a user flipping a switch in the-vehicle to start charging the battery 40. The other input indicates that a connector for charging the battery 40 has been correctly connected to charge connector 21 of the system control unit 12.

As explained briefly, the memory 505 of the microprocessor 500 includes certain program instructions used to control operations of the chassis controller 22. These program instructions, preferably written in the C programming language, are part of the chassis controller software that will be explained in detail below.

In general, the microprocessor 500 executing instructions included in the components and subcomponents stored in the chassis controller memory 505 receives the following signals:

(1) key switch signal indicating start and stop of the vehicle, (2) gear shift (drive selector) signal indicating the current gear (P for Park, R for Reverse, N for Neutral, and D for Drive) of the vehicle, (3) brake pedal position signals and accelerator pedal position signals indicating current positions of each of the pedals, (4) charge-enabled signal indicating that a driver has enabled the switch to charge the battery 40, (5) charge-plug-connected signal indicating that the charge plug has been connected correctly to the system unit 12, (6) current-battery signals indicating the current state-of-charge of the battery 40 (one signal for low charge and another signal for fully charged), and (7) built-in-test signals for the BIT (built-in-test) mode processing.

The microprocessor 500 also sends and receives signals to vehicle controls and sensors via the interfaces 530 and 535, sends status signals to and receives rpm signals from the vector control board 46, and sends, via the digital interface circuitry 560, an emergency stop signal and certain LED on/off signals to turn certain LEDs on and off as is appropriate.

The processing of the components and subcomponents 600, 700, 800, 900, 1000, 1075, 1300, and 1400 of the chassis control software will now be explained in detail with reference to FIGS. 6–14.

The operations of the chassis control software are interrupt driven, meaning that most of the steps are performed in response to a real time interrupt that preferably occurs every 32.77 milliseconds. This interrupt determines how often the steps of the mode processing and related components 700, 800, 1000, 1075 are executed. The microprocessor 500, using the steps of the control processing component 600 (FIG. 6), controls the operations of the chassis controller.

In step 610, the microprocessor 500 executes a number of steps to initialize variables as well as the real time interrupt timer used to time the operations of the components of the chassis controller software. In this step the microprocessor 500 also resets all global variables used by the components of the chassis controller software; resets accelerator and brake pedal position offsets from the memory 505 (used when determining current pedal positions for generating torque values); initializes the analog interface circuitry 565 to ensure communication with analog sensors in the vehicle; initializes serial communications with the vehicle (via the J1850 communications interface 530 or the CCD serial bus interface 535) or an external diagnostics system (via RS232 connector 550); and enables a watchdog timer that is used to ensure the microprocessor 500 is operating properly. Then, the microprocessor 500 determines whether the real time interrupt timer has reached the set time of 32.77 milliseconds (step 610). If so, then the microprocessor 500 receives the digital values (via the digital interface circuitry 560) for the key switch signal, gear shift signal (indicating Park, Reverse, Neutral, and Drive), charge-plug-connected signal, and charge-enabled signal (step 630). The microprocessor 500 then executes the steps of the state-of-charge subcomponent 1400 illustrated in FIG. 14 (step 640).

After executing the steps of the state-of-charge subcomponent 1400 that are discussed in detail below (step 640), the microprocessor 500 executes the steps of the mode processing component 800 illustrated in FIG. 8 (step 650) and then sends a command to the vector control board 46 via MC serial bus interface 525 (step 660).

Between real time interrupts, the microprocessor handles serial communication between the chassis controller 22 and the vector control board 46. Otherwise, if the real time interrupt timer has not reached the predetermined interrupt time (32.77 milliseconds) in step 620, then the microprocessor 500 executes the steps of the A/D (analog to digital) interface processing component 700 (step 670) and then receives a status signal and/or an rpm signal from the vector control board 46.

For every command sent to the vector control board 46, the microprocessor 500 must receive a status signal back (step 680). This provides error checking for the MC serial bus interface 525 by ensuring that only valid commands are sent and that the status signal is correct (step 685). If the status is not correct (step 685) and the number of invalid status signals has exceeded a predetermined limit (step 690), then the microprocessor 500 sends a command to the vector control board 46 to go into its neutral state (step 695). If the limit has not been exceeded (step 690), then the microprocessor 500 continues processing at step (620). Also, if the status signal received from the vector control board 46 is correct, then the microprocessor 500 continues processing at step 620.

Figure 7:
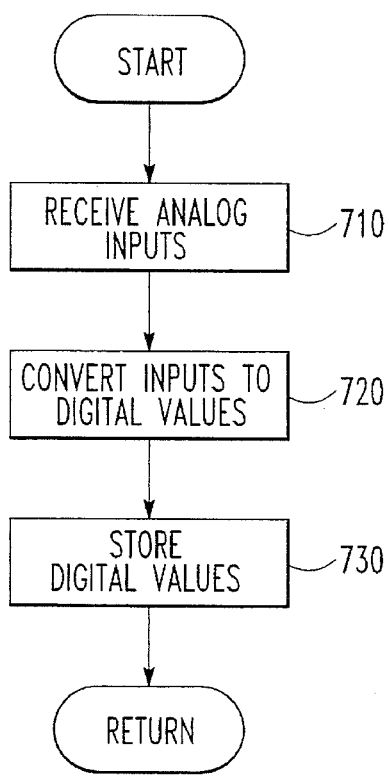
FIG. 7 is a flow diagram illustrating the instructions of the analog-to-digital interface processing component stored in the chassis controller memory shown in FIG. 5.

FIG. 7 illustrates the steps of the A/D interface processing component 700. Between real time interrupts, the microprocessor 500 is also controlling the A/D interface circuitry 565 by causing it to sample each of the eight analog input signals (step 710), converting them to 8-bit digital values (step 720), and storing the digital values in its memory 505 (step 730). The function of the eight analog input signals is outlined below:

(1) 5-volt reference for BIT;
(2) accelerator position 1;
(3) accelerator position 2;
(4) battery current (low);
(5) brake position 1;
(6) brake position 2;
(7) battery current (high); and
(8) ground reference for BIT.

These input signals are used by the steps of other components of the chassis controller software described below. As explained above, the chassis controller 22 is the interface between the driver and the motor. These driver-related input signals determine the state of the chassis controller 22 and the motor controller 18.

After each real time interrupt the microprocessor 500 executes the steps of various components of the chassis controller software. The microprocessor 500 monitors the accelerator and brake, manages torque, calculates data for charge, reads the gear select inputs, and receives motor controller and chassis controller status. Based on the results of these routines, the microprocessor 500 switches itself among a number of states or modes as determined by the mode processing component 800 to be described in detail. In general, however, the microprocessor 500 provides different functions in each mode. In drive (forward and reverse) mode, it calculates the torque value for the motor 28. It also receives a motor rpm value to calculate vehicle speed and distance travel values for the speedometer and odometer. In charge mode, it commands the motor controller 18 to recharge the battery 40. In BIT mode it controls all diagnostic tests for the chassis controller 22 and the motor controller 18. In all the modes, the microprocessor 500 continuously calculates the state-of-charge of the battery 40.

Figure 6:
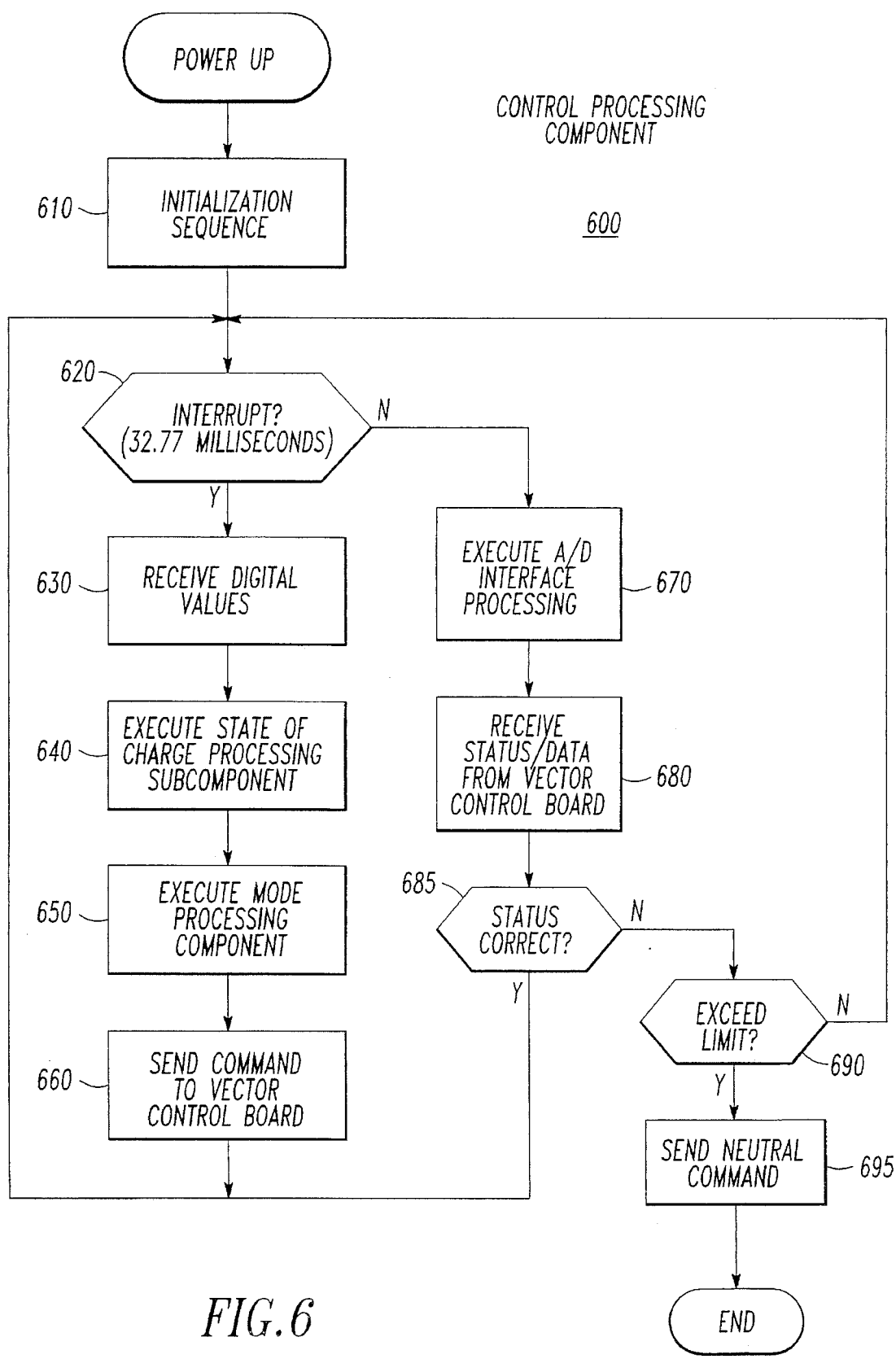
FIG. 6 is a flow diagram illustrating the instructions of the control processing component stored in the chassis controller memory shown in FIG. 5.
Figure 8:
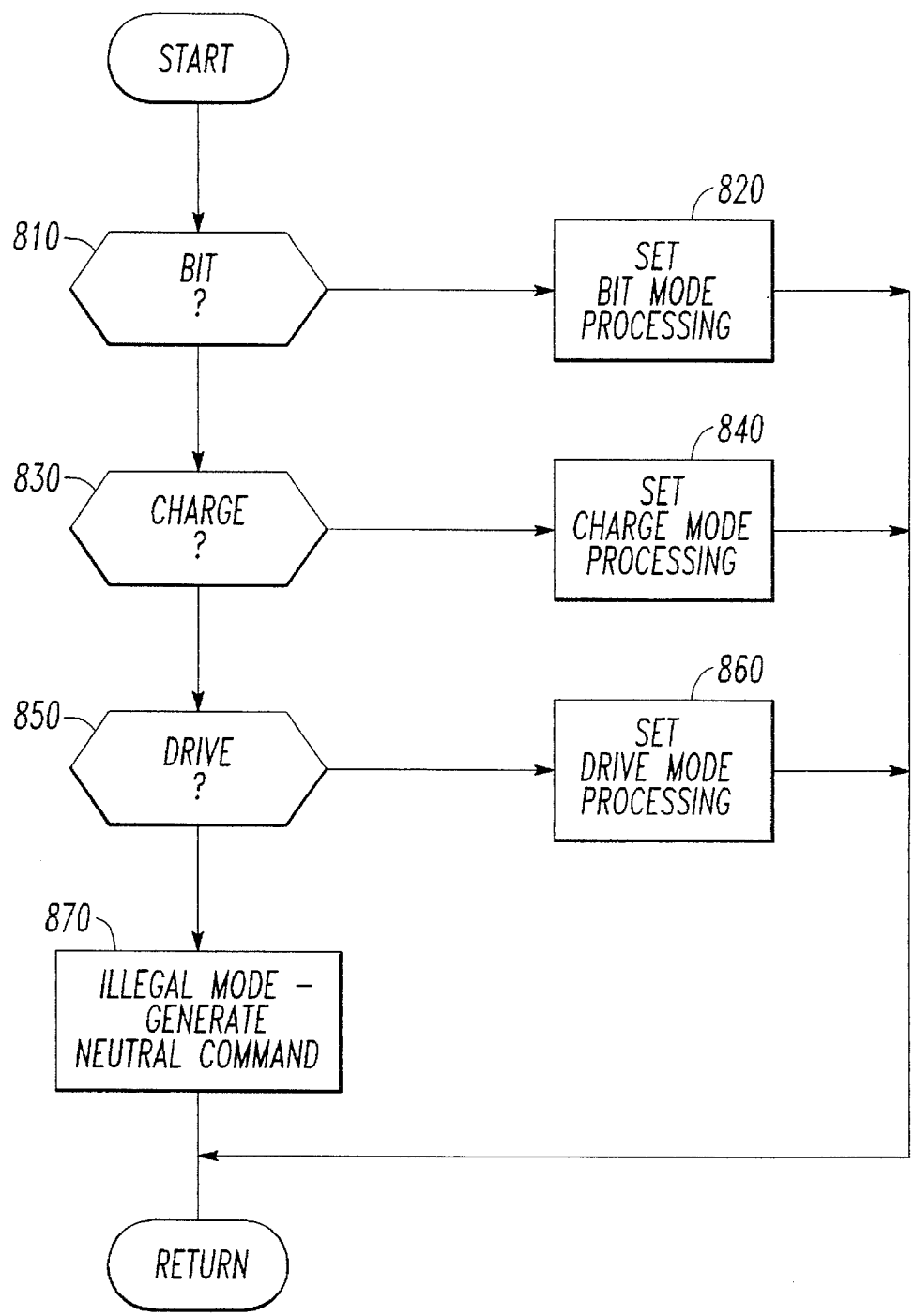
FIG. 8 is a flow diagram illustrating the instructions of the mode processing component stored in the chassis controller memory shown in FIG. 5.

The steps of the mode processing component 800 are illustrated in FIG. 8. As discussed above, the microprocessor 500 executes the steps of the mode processing component 800 at step 650 of the control processing component 600 (FIG. 6).

In mode processing, the microprocessor 500 generally determines its state and mode of operation. The microprocessor 500 first determines whether the digital data received in step 630 indicates that BIT mode (step 810), charge mode (step 830), or drive mode (step 850). If the digital data does not indicate one of these modes, then the chassis controller 22 received an illegal mode, in which case, the microprocessor 500 generates a command for the vector control board 46 (via the MC serial bus interface) to enter the neutral state. This prevents further operation of the vehicle until the microprocessor 500 sends a reset command to the vector control board 46. The neutral command is sent to the vector control board 46 in step 660 of FIG. 6.

Figure 9:
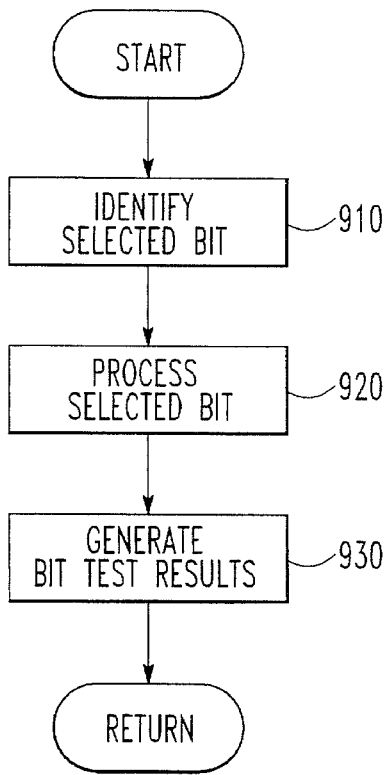
FIG. 9 is a flow diagram illustrating the instructions of the BIT mode processing component stored in the chassis controller memory shown in FIG. 5.

If the digital data received by the microprocessor 500 indicates a BIT mode (step 810), then the microprocessor 500 sets itself in the BIT mode processing state to execute the steps of the BIT mode processing component 900 illustrated in FIG. 9.

If the digital data received by the microprocessor 500 indicates a charge mode (step 820), then the microprocessor 500 sets itself in the charge mode processing state to execute the steps of the charge mode processing component 1300 illustrated in FIG. 13.

Figure 10:
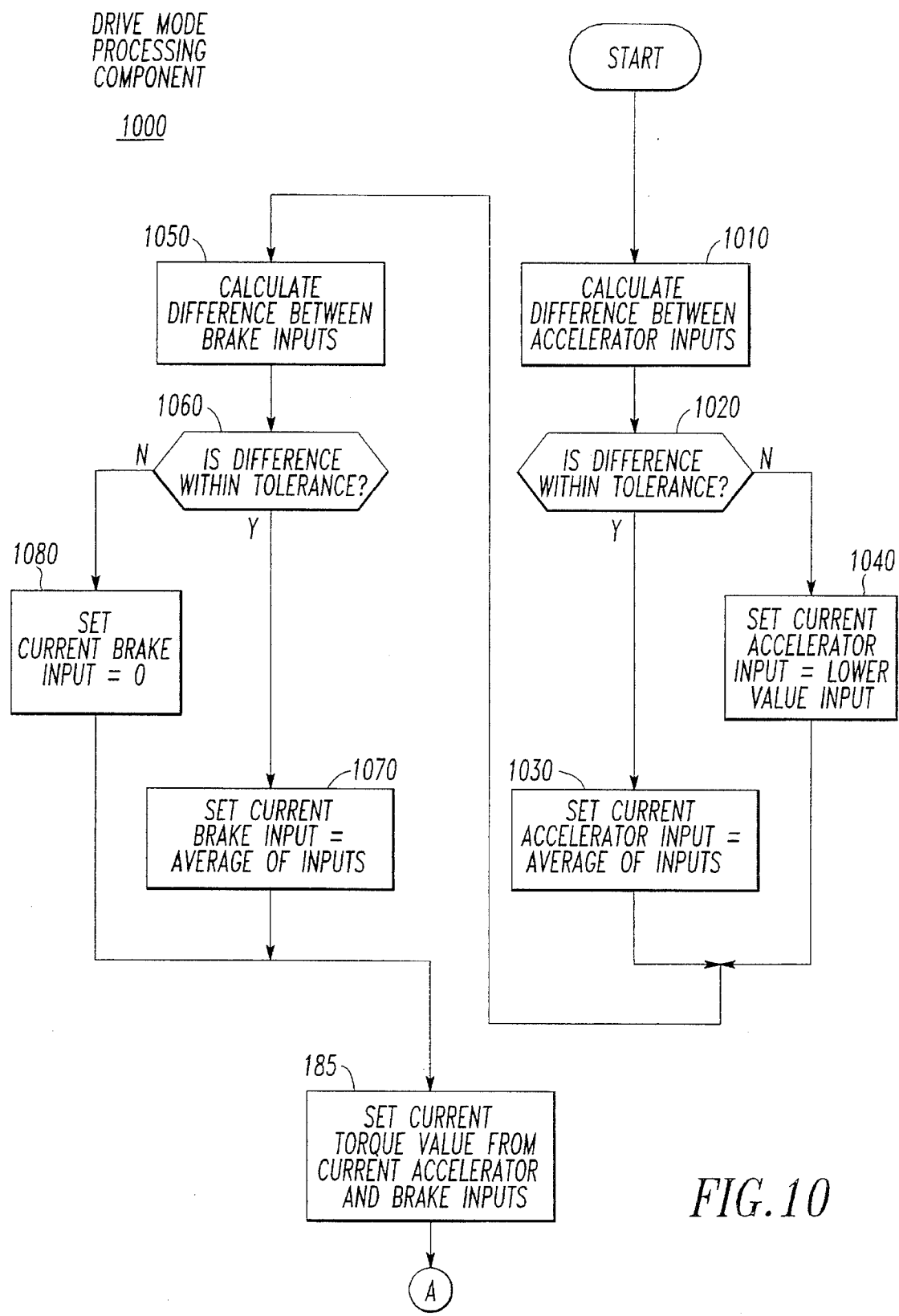
FIGS. 10 and 11 are a flow diagram illustrating the instructions of the drive mode processing component stored in the chassis controller memory shown in FIG. 5.
Figure 11:
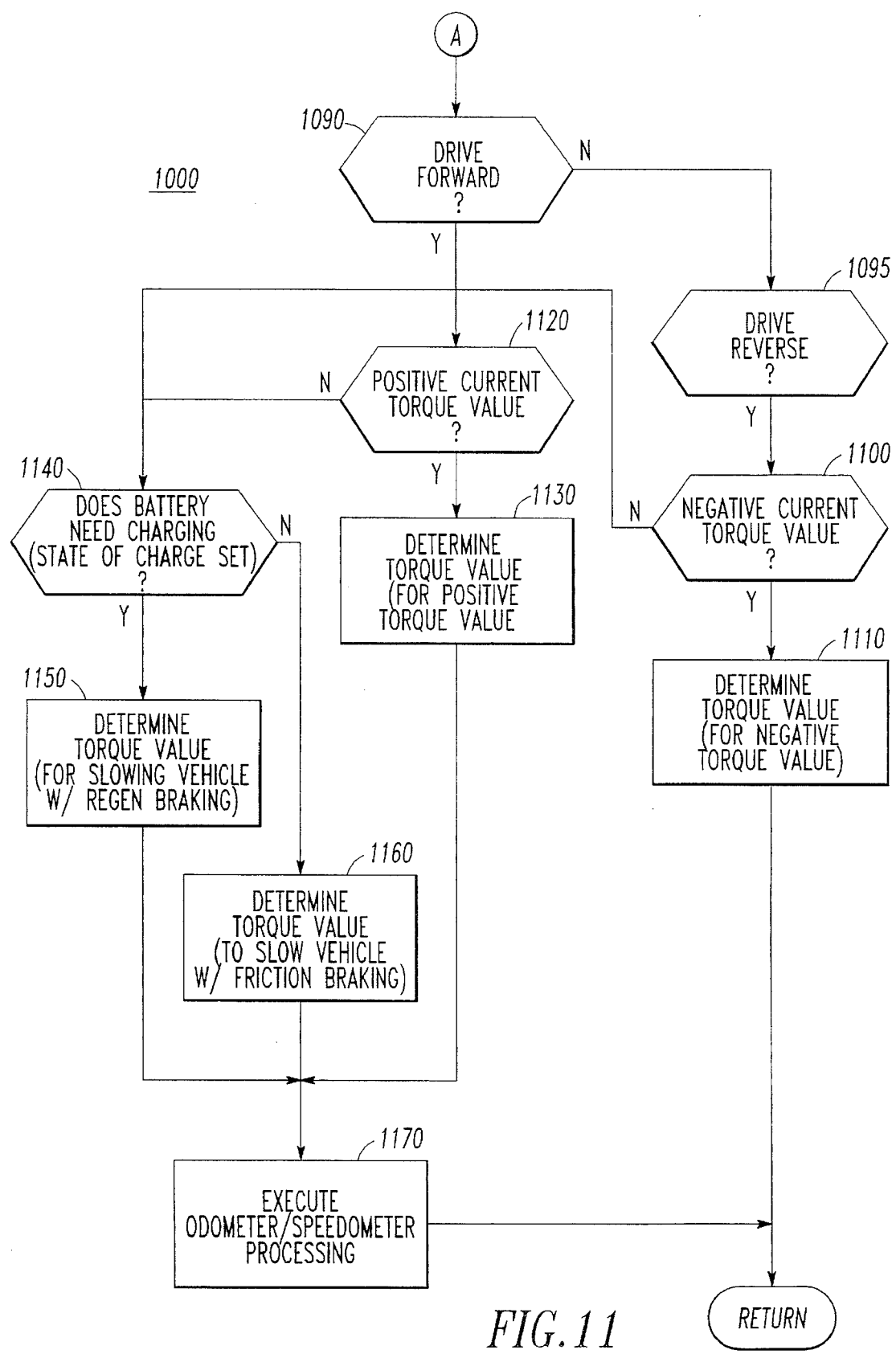
Figure 12:
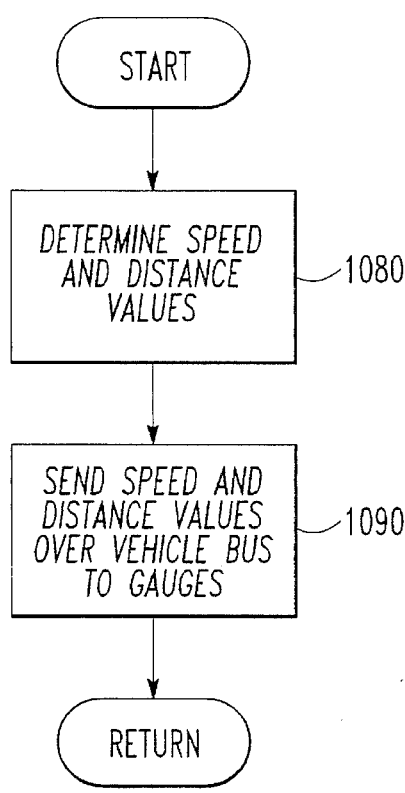
FIG. 12 is a flow diagram illustrating the instructions of the odometer and speedometer processing subcomponent stored in the chassis controller memory shown in FIG. 5.
Figure 13:
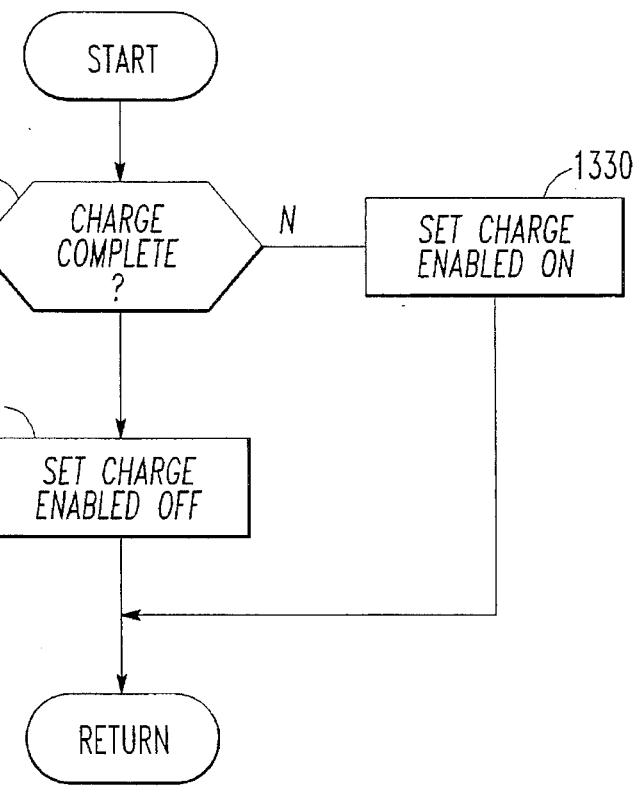
FIG. 13 is a flow diagram illustrating the instructions of the charge mode processing component stored in the chassis controller memory shown in FIG. 5.

Finally, if the digital data received by the microprocessor 500 indicates a drive mode (step 850), then the microprocessor 500 sets itself in the drive mode processing state to execute the steps of the drive mode processing component 1000 (and odometer/speedometer processing subcomponent 1075) illustrated in FIGS. 10–12.

FIG. 9 illustrates the steps of the BIT mode processing component 900. When maintenance is performed on the vehicle, the technician can connect a diagnostic interface to the chassis controller 22 via a vehicle serial communication bus connected to the RS232 connector 500. The technician then can send a command to the chassis controller 22 indicating which BIT test to run and the mode processing component 800 will control the BIT tests in the chassis controller 22 and motor controller 18. When the test is complete, the results are stored and sent back to the diagnostic interface. An important safety feature in the chassis controller 22 is that once placed in BIT mode, the microprocessor 500 must be reset before the vehicle may be driven. Some of the BIT tests may leave the chassis controller 22 or motor controller 18 in an invalid state. To ensure that the controllers 22 and 18 are in a known state, the vehicle must be powered off.

In the BIT mode of FIG. 9, the microprocessor 500 first identifies, using the digital BIT data (converted from either analog data received in step 670 of the steps of the control processing component 600 and converted to digital data by the A/D interface processing component 700 or digital BIT data from an external device connected to the RS232 connector 550), the selected BIT test selected (step 910). The microprocessor 500 then processes the selected BIT test (step 920). BIT tests can include tests of the microprocessor 500 and its operations, as well as generating commands for the vector control board 46 to run its built in tests. After it processes the BIT tests, the microprocessor 500 generates BIT test results (step 930). BIT test results may be sent to the vector control board 46 in step 660 of the control processing component 600. BIT test results may also be sent to an external device attached to the RS232 connector 550. Finally, in certain instances, BIT test results may not leave the microprocessor 500. The ultimate destination of the BIT test results depends upon the source of the initial signal identified in step 910. For example, if the data in step 910 was received from the vehicle via the J1850 communication interface 530 then that is where the microprocessor 500 returns the result.

FIGS. 10–12 illustrate the steps of the drive mode processing component 1000 and odometer/speedometer processing subcomponent 1075 (FIGS. 10–12). The steps of the drive mode processing component 1000 and odometer/speedometer processing subcomponent 1075 are executed when the microprocessor 500 (using the mode processing component 800) sets the current state of the microprocessor 500 to be the drive mode.

While in drive mode (forward or reverse), the microprocessor 500 reads the converted accelerator and brake inputs and calculates a torque value for the motor controller 18. For safety, there are two accelerator and two brake inputs representing the position of the accelerator and brake pedals. In general, the microprocessor 500 calculates the difference between the two brake values and the difference between the two accelerator values. If the difference is within a specified tolerance, the average of the two is used. In the case of the accelerator inputs, if the difference is not within tolerance, the lower accelerator value is used. If the brake input difference is not within tolerance, the brake value is set to zero. The new brake and accelerator values are then used to generate a torque value for the motor controller 18. In drive forward, a positive torque value will accelerate the vehicle forward and a negative value will slow the vehicle through regenerative braking. In drive reverse, a vehicle torque value will accelerate the vehicle backward and a positive value will slow the vehicle.

Applying the brakes will not always cause regenerative braking. A flag indicating whether the battery needs to be charged determines whether vehicle deceleration will be caused by regenerative braking. If charge is not required, when the brakes are applied, no regenerative braking will occur. The vehicle will rely only on friction brakes. Using the steps of the state-of-charge subcomponent 1400, the microprocessor 500 sets the flag indicating whether the battery requires recharging. The detailed steps of the drive mode processing component 1000 will now be explained.

In step 1010, the microprocessor 500 calculates the difference between the digital values for the two accelerator pedal position analog signals received at step 710 of the A/D interface processing component 700. If the difference between the digital values for the accelerator pedal position analog signals is within a predetermined tolerance level (step 1020), then the microprocessor 500 sets the current accelerator input value equal to the average of the first and second digital values for the accelerator pedal position analog signals (step 1030). Otherwise, the microprocessor 500 sets the current accelerator input value equal to the lower of the two digital values for the accelerator pedal position analog signals (step 1040).

Then, the microprocessor 500 calculates the difference between the digital values for the two brake pedal position analog signals received at step 710 of the A/D interface processing component 700 (step 1050). If the difference between the digital values for the brake pedal position analog signals is within a predetermined tolerance level (step 1060), then the microprocessor 500 sets the current brake input value equal to the average of the first and second digital values for the brake pedal position analog signals (step 1070). Otherwise, the microprocessor 500 sets the current brake input value equal to zero (step 1080).

Next, the microprocessor 500 sets the current torque value from a combination of the current accelerator and brake input values (step 1085). The steps of the drive mode processing component continue in FIG. 11.

If the microprocessor 500 determines that digital input for the drive selector switch (received via the digital interface circuitry 560) indicates that the vehicle is in drive forward (step 1090), then the microprocessor 500 determines whether the current torque value is positive (step 1120). Otherwise, the microprocessor 500 determines whether the digital input for the drive selector switch (received via the digital interface circuitry 560) indicates that the vehicle is in drive reverse (step 1095), in which case the microprocessor 500 determines whether the current torque value is negative (step 1100).

If the digital input for the drive selector switch indicates that the vehicle is in drive forward (step 1090) and the current torque value is positive (step 1120), or if the digital input for the drive selector switch indicates that the vehicle is in drive reverse (step 1095) and the current torque value is not negative (1100), then the microprocessor 500 determines, in step 1140, whether the state-of-charge flag (discussed below with reference to FIG. 14 and steps of the state-of-charge subcomponent 1400) indicates that the battery 40 needs charging. The state-of-charge flag indicates that the battery needs charging when the analog input for battery current (low) indicates this. If yes, then the microprocessor 500 determines the torque value necessary for slowing the vehicle using regenerative braking and sets the torque value for the output command to the vector control board 46 equal to the newly calculated torque value (step 1050). In reverse this torque value is positive, but in drive forward it is negative. If the battery does not need charging (step 1140), then the microprocessor 500 determines the required torque value to slow the vehicle with friction braking and sets the new torque value for the output command to the vector control board 46 equal to the newly calculated value (step 1160).

If the digital input for the drive selector switch (received via the digital interface circuitry 560) indicates that the vehicle is in drive forward (step 1090) and the current torque value is positive (step 1120), then the microprocessor 500 simply sets the new torque value for the output command to the vector control board 46 equal to the current torque value.

If however in step 1100 the microprocessor 500 determines that the current torque value is negative, then the microprocessor 500 simply sets the torque value for the output command to the vector control board 46 equal to the current torque value. In this case, the steps of the control processing component 600 begin again at step 660 and the output command (including the new torque value) is sent to the vector control board 46.

After performing the function specified in steps 1130, 1150, and 1160, the microprocessor 500 executes the steps of the odometer/speedometer processing subcomponent 1075. (The steps of the odometer/speedometer subcomponent 1075 are not executed by the microprocessor 500 when the vehicle is in drive reverse.) At this point, the microprocessor 500 has completed the steps of the drive mode processing component and continues processing with the steps of the control processing component 600 and the output command (including the new torque value) to the vector control board 46 is sent in step 660.

The steps of the odometer/speedometer processing subcomponent 1075 are shown in FIG. 12. In step 1080, the microprocessor 500 determines the current speed and distance using RPM (revolutions per minute) values from the vector control board 46. The microprocessor 500 receives these RPM values via the MC serial bus interface 525. Then the microprocessor 500 sends speed and distance data via one of the J1850 communications interface 530 or the CCD serial bus interface 535, depending upon the type of vehicle. The vehicle gauges then display this data.

FIG. 13 illustrates that steps of the charge mode processing component 1300. As explained above, when the mode processing component 800 sets the microprocessor 500 in the charge mode (step 840 of FIG. 8), then the microprocessor 500 executes the steps of the charge mode processing component 1300.

In step 1310, the microprocessor 500 determines whether the battery 40 is fully charged. This determination is made using the analog signal from the battery current sensor connected to the analog interface circuitry 565. This analog signal corresponds to the state-of-charge flag that indicates the battery current as "high" when the battery does not need charging and "low" when it does need charging. Like all other analog input signals, the A/D interface processing component 700 converts the battery current signals to digital data.

If the digital data (state-of-charge flag) for the battery current signals indicates that the battery is fully charged (step 1310), then the microprocessor 500 sets the charge-enabled flag to the "off" state (step 1320). The microprocessor 500 then leaves the charge mode. Otherwise, the microprocessor 500 resets the charge-enabled flag to the "on" state (step 1330). In this case, the microprocessor 500 sends a command to the vector control board 46 (in step 660 of the steps of the control processing component 600) indicating that the charge-enabled flag is on.

Figure 14:
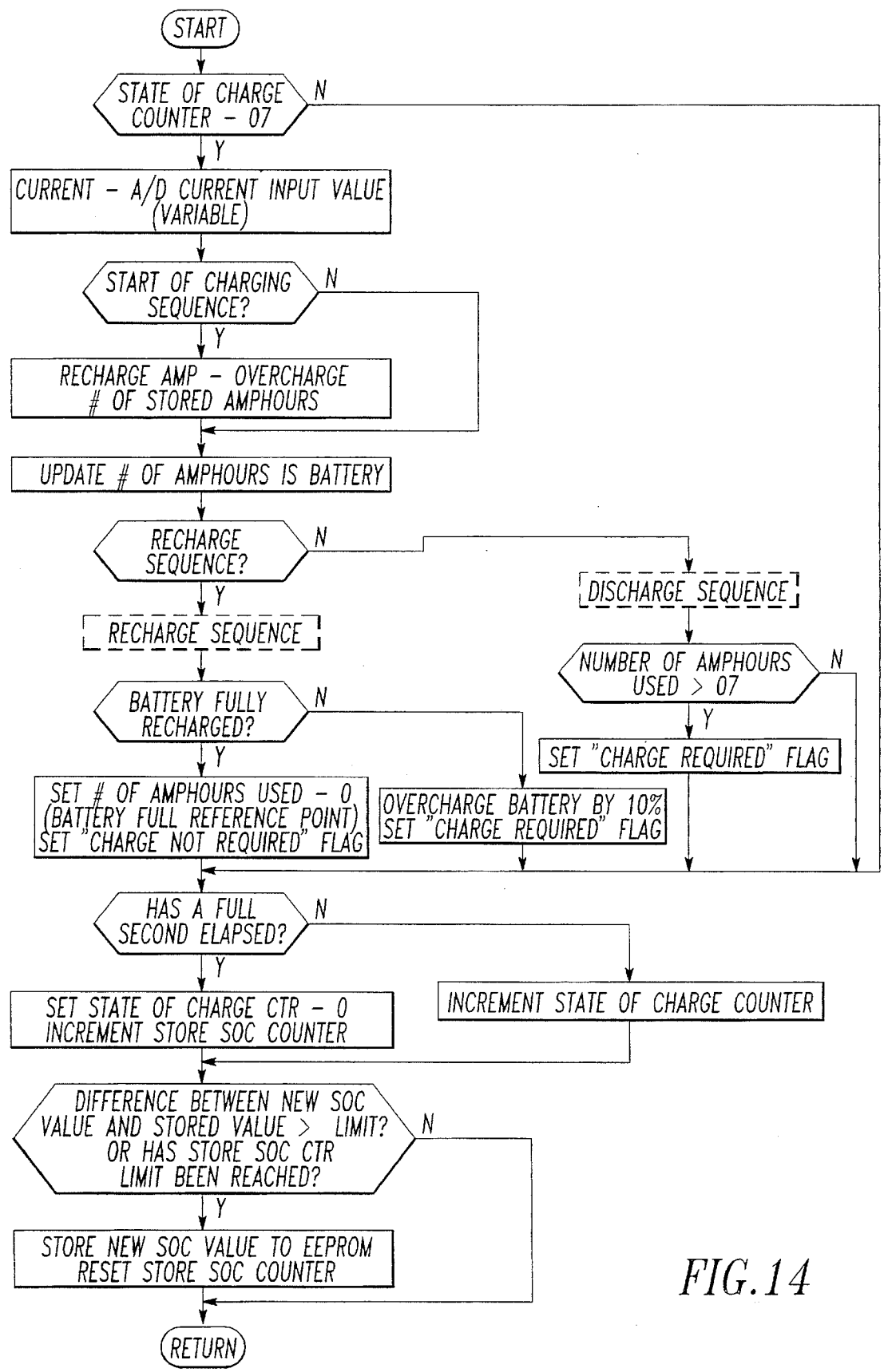
FIG. 14 is a flow diagram illustrating the instructions of the state-of-charge subcomponent stored in the chassis controller memory shown in FIG. 5.

FIG. 14 illustrates the steps of the state-of-charge processing subcomponent 1400 of the chassis controller software. As discussed above, the steps of the state-of-charge processing subcomponent 1400 are executed by the microprocessor 500 at step 640 of the steps of the control processing component 600.

In general, executing the steps of the state-of-charge subcomponent 1400, the microprocessor 500 tracks the state-of-charge of the battery 40 in terms of amp-halfseconds and amp-hours. This value can then be sent over the vehicle serial communication bus to be used to drive the "fuel" gauge. Every halfsecond the microprocessor 500 reads the converted battery current sensor values. Based on whether the value is positive (recharge value) or negative (discharge value) the stored state-of-charge value is altered.

The microprocessor 500 determines whether the battery 40 is being discharged or recharged. If it is being recharged, the microprocessor 500 determines whether it is the beginning of a recharging sequence. If so, it calculates how much charge the battery 40 requires and increases it by ten percent. When no charge is required the charge value is set to zero, which indicates that the battery 40 is full. The microprocessor 500 resets a "charge required" flag to indicate the battery 40 is full. If the charge value is greater than zero, the "charge required" flag is set to indicate that recharging is possible.

To gain the maximum usage from a battery 40, there is a limit to how much charge may be drained from it. Therefore, it is important to have accurate information on how much charge is stored in the battery at any given time. The microprocessor 500 writes the state-of-charge to its memory 505. The problem is that the area of memory 505 where the state-of-charge is stored (that is, the EEPROM area) may only be written to a limited number of times. The value should be stored often enough to maintain state-of-charge accuracy, but infrequent enough for the memory 505 to last a long time. As explained below, the microprocessor 500 solves this problem but does not compromise the state-of-charge accuracy or the lifecycle of the EEPROM of the memory 505.

Every halfsecond the microprocessor 500 compares its stored charge value against a new calculated value. A counter tracks how much time has lapsed since the last value was stored. If the difference between the two values is within a specified tolerance, then the counter will continue to increment until five minutes have passed. At this time the new calculated value will be stored. If the difference between the calculated value and the previous value exceeds the specified tolerance, due to high current draw, then the new value will be stored immediately. The counter which tracks the time between memory writes will be reset.

The detailed steps of the state-of-charge processing subcomponent 1400 will now be explained with reference to the flow diagram of FIG. 14. In step 1410, the microprocessor 500 determines whether the state-of-charge counter is zero. The state-of-charge counter is set to zero, for example, when the vehicle is started and the reset logic 515 resets the microprocessor 500. If no, then the microprocessor 500 continues at step 1520 of the steps of the state-of-charge processing subcomponent 1400. Otherwise, the microprocessor 500 sets current equal to digital value for the battery current signals converted by the A/D interface processing component 700 (step 1420).

If the battery charger is connected to the system 12 (indicated by the digital data for charger connected received by the microprocessor 500 via the digital interface circuitry 560) and the microprocessor 500 is in charge mode (indicated by the digital data for charge mode received by the microprocessor 500 via the digital interface circuitry 560) (step 1430), then the microprocessor 500 sets that recharge amount equal to 1.10 times the number of stored amp-hours (step 1440). The number of stored amp-hours is a value maintained in the memory 505 of the microprocessor 500. This step enables the microprocessor 500 to make sure that the battery charger attempts to recharge the battery 40 with at least 10 percent more amps than anticipated. Then the microprocessor 500 sends an update of the amp-hours in the battery (or the digital data for the battery current signals converted by the A/D interface processing component 700) to the vehicle bus via the J1850 communications interface 530 or the CCD serial bus interface 535, depending upon the type of vehicle (step 1450).

Next, the microprocessor 500 determines whether recharge sequence is appropriate (step 1460). This is determined based upon whether the digital value for the battery current signals is positive or negative. If the data is negative then recharge sequence is appropriate, otherwise discharge sequence is appropriate. If the recharge sequence is appropriate (step 1460), then the microprocessor 500 determines whether the battery is fully charged (step 1470). This is indicated by a flag that is set on when the battery is fully charged and off when it is not. If the battery 40 is not fully charged, then the microprocessor 500 sets the number of amp-hours used equal to zero and sets the charge off indicating that the battery 40 is fully charged (step 1480). If the battery is not fully charged (step 1470), then the microprocessor 500 sets the charge-required flag on indicating the battery charger 16 should continue to charge the battery 40 (step 1510).

If the battery current signal is negative (and the battery is currently being discharged) (step 1460), then the microprocessor 500 performs the discharge sequence beginning with step 1490. In step 1490 the microprocessor 500 determines whether the number of amp-hours used, a value stored by the microprocessor 500, is greater than 0. If yes, then the microprocessor 500 sets the charge required flag on. In other words, the battery needs charging because it has been discharged. Otherwise, flow continues in step 1520.

In step 1520, the microprocessor 500 determines whether a half second has elapsed. This is determined based on the current value of the state-of-charge counter (referred to in step 1410). If a half second has elapsed, then the microprocessor 500 sets the state-of-charge counter back to 0 and increments a store-SOC counter (step 1530). Otherwise, the microprocessor 500 simply increments the store-SOC counter (step 1540).

Next, the microprocessor 500 determines whether the difference between the new state-of-charge value and the previously stored state-of-charge value is greater than a predetermined limit, or whether the store-SOC counter incremented in step 1540 has reached a predetermined limit (step 1550). This test is designed to determine whether (1) a predetermined time limit has been reached (for example, a value indicating that five minutes have elapsed since the last time the microprocessor 500 stored the state-of-charge value to its memory 505), or (2) the motor 28 is using a lot of current (that is, the discharge rate is high). In either case, the microprocessor 500 stores the new state-of-charge value to its memory 505 and resets that store state-of-charge counter (step 1560). After step 1560, the processing of the state-of-charge processing subcomponent is complete. Again, steps 1520 to 1560 are only executed by the microprocessor 500 after each half second, which is calculated using the state-of-charge counter. This is different from the store-SOC counter, which is used to calculate the appropriate time to store the new state-of-charge value in the memory 505. The chassis controller described above thus provides portability among various vehicle platforms. It also provides a communication link between a driver and the motor controller, translating driver inputs into commands for vehicle responses (e.g. brake and accelerator pedal positions into torque values).

It should be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

We claim:

1. A vehicle power controller for a vehicle including an electric motor that drives the vehicle, a plurality of sensors and a motor controller, wherein the plurality of sensors includes an accelerator sensor for sensing a position of an accelerator pedal and a brake sensor for sensing a position of a brake pedal, and wherein the motor controller controls torque output of the motor, the vehicle power controller comprising:

means for receiving signals from the accelerator sensor and the brake sensor;

means for comparing multiple accelerator sensor signals to thereby generate an accelerator torque value;

means for comparing multiple braking sensor signals to thereby generate a braking torque value;

means for combining the accelerator torque value and the braking torque value to thereby generate a current torque value; and means for outputting the current torque value to the motor controller for controlling the torque output of the motor.

2. A vehicle power controller for a vehicle including a battery, an electric motor that drives the vehicle, a plurality of sensors, and a motor controller, wherein the plurality of sensors includes a battery sensor for sensing a state-of-charge of the battery, an accelerator sensor for sensing a position of an accelerator pedal and a brake sensor for sensing a position of a brake pedal, and wherein the motor controller controls torque output of the motor, the vehicle power controller comprising:

means for receiving signals from the plurality of sensors;

means for converting the accelerator sensor signal to an accelerator torque value, the battery sensor signal to a battery torque value, and the braking sensor signal to a braking torque value;

means for generating a current torque value based on said battery torque value, said accelerator torque value and said braking torque value; and means for outputting the current torque value to the motor controller for controlling the torque output of the motor.

3. A vehicle power controller for a vehicle that includes a battery, an electric motor that drives the vehicle, a plurality of sensors, and a motor controller, wherein the vehicle is capable of moving in either a forward direction or a reverse direction, wherein the plurality of sensors includes a drive selector sensor that senses a current drive-state of the vehicle corresponding to whether the vehicle is moving the forward direction or the reverse direction, a battery sensor that senses a state-of-charge of the battery, an accelerator sensor that senses a position of an accelerator pedal and a brake sensor that senses a position of a brake pedal, and wherein the motor controller controls torque output of the motor, the vehicle power controller comprising:

means for receiving signals from the plurality of sensors;

means for converting the signals for the plurality of sensors into a torque value; and means for outputting the torque value to the motor controller for controlling the torque output of the motor, wherein said torque value is a negative value when said battery sensor signal indicates that the battery needs charging and said drive selector sensor signal indicates that the current drive-state is forward, and wherein said torque value is negative when said battery sensor signal indicates that the battery needs charging and said drive selector sensor signal indicates that the current drive-state is reverse.

4. The vehicle power controller of claim 3 wherein the converting means comprises first means for determining whether the signal for the battery sensor indicates that the battery does or does not need charging.

5. The vehicle power controller of claim 4 wherein the converting means further comprises second means for determining whether the signal for the drive selector sensor indicates that the current drive-state of the vehicle is in the forward or reverse direction.

6. The vehicle power controller of claim 5 wherein when the first determining means determines that the signal for the battery sensor indicates that the battery does not need charging and the second determining means determines that the current drive-state of the vehicle is the forward direction, then the torque value is a positive value.

7. The vehicle power controller of claim 5 wherein when the first determining means determines that the signal for the battery sensor indicates that the battery does not need charging and second determining means determines that the signal for the drive selector sensor indicates that the current drive-state of the vehicle is in the reverse direction then the torque value is a negative value.

8. The vehicle power controller of claim 3 the vehicle power controller further comprising:
means for receiving a signal from the motor controller indicating an rpm value for the motor; and
means for converting the signal received from the motor controller into a value corresponding to a current speed of the vehicle.

9. The vehicle power controller of claim 8 further comprising:
means for outputting the value for the current speed of the vehicle.

10. The vehicle power controller of claim 3, wherein a diagnostic device is connectable to vehicle power controller, the vehicle power controller further comprising:
means for receiving a BIT signal from at least one of the diagnostic device and the motor controller; and
means for processing a BIT test corresponding to the BIT signal.

11. The vehicle power controller of claim 10 further comprising:
means for outputting a result for the BIT test to at least one of the diagnostic device and the motor controller.

12. The vehicle power controller of claim 11 further comprising:
means for determining a BIT source corresponding to whether the BIT signal was received by the receiving means from the diagnostic device or the motor controller; and
means for outputting a result for the BIT test to the BIT source.

13. A vehicle power controller for a vehicle that includes a battery, an electric motor that drives the vehicle, a plurality of analog sensors, a plurality of digital sensors, and a motor controller, wherein the vehicle is capable of moving in either a forward direction or a reverse direction, wherein the plurality of analog sensors includes a battery sensor that senses a state-of-charge of the battery, an accelerator sensor that senses a position of an accelerator pedal and a brake sensor that senses a position of a brake pedal, wherein the digital sensors include a drive selector sensor that senses a current drive-state of the vehicle corresponding to whether the vehicle is moving the forward direction or the reverse direction, and wherein the motor controller controls torque output of the motor, the vehicle power controller comprising:
means for receiving signals from the plurality of analog sensors;
means for converting the signals for the plurality analog sensors into a plurality of digital signals;
means for determining a torque value using the plurality of digital signals; and
means for outputting the torque value to the motor controller for controlling the torque output of the motor,
wherein said torque value is negative when the battery sensor signal indicates that the battery needs charging and the drive selector sensor signal indicates that the current drive-state is forward.

14. The vehicle power controller of claim 13 wherein the determining means comprises:
means for receiving a digital drive signal from the drive selector sensor;
first means for determining whether the battery needs charging using the digital signal corresponding to the converted signal for the battery sensor; and
second means for determining the current drive-state of the vehicle from the digital drive signal.

15. The vehicle power controller of claim 14 wherein when the first determining means determines that the battery needs charging and the second determining means determines that the current drive-state of the vehicle is in the reverse direction then the torque value is a positive value.

16. The vehicle power controller of claim 14 wherein the motor charges the battery when the first determining means determines that the battery needs charging.

17. The vehicle power controller of claim 14 wherein when the first determining means determines that the battery does not need charging and the second determining means determines that the current drive-state of the vehicle is in the forward direction then the torque value is a positive value.

18. The vehicle power controller of claim 14 wherein when it is determined that the battery does not need charging and the current drive-state of the vehicle is in the reverse direction then the torque value is a negative value.

19. A computer-implemented method for controlling propulsion of a vehicle including an electric motor that drives the vehicle, a plurality of sensors, a microprocessor, and a motor controller, wherein the plurality of sensors includes an accelerator sensor for sensing a position of an accelerator pedal and a brake sensor for sensing a position of a brake pedal, and wherein the motor controller controls torque output of the motor, the method comprising the steps of:
receiving signals from the accelerator sensor and the brake sensor;
comparing multiple accelerator sensor signals to thereby generate an accelerator torque value;
comparing multiple braking sensor signals to thereby generate a braking torque value;
combining the accelerator torque value and the braking torque value to thereby generate a current torque value; and
outputting the current torque value to the motor controller for controlling the torque output of the motor.

20. A computer-implemented method for controlling propulsion of a vehicle including a battery, an electric motor that drives the vehicle, a plurality of sensors, a microprocessor, and a motor controller, wherein the plurality of sensors includes a battery sensor for sensing a state-of-charge of the battery, an accelerator sensor for sensing a position of an accelerator pedal and a brake sensor for sensing a position of a brake pedal, and wherein the motor controller controls torque output of the motor, the method comprising the steps of:

receiving signals from the plurality of sensors;

converting the accelerator sensor signal to an accelerator torque value, the battery sensor signal to a battery torque value, and the braking sensor signal to a braking torque value;

generating a torque value based on said battery torque value, said accelerator torque value and said braking torque value; and outputting the torque value to the motor controller for controlling the torque output of the motor.

21. A computer-implemented method for controlling propulsion of a vehicle that includes a battery, an electric motor that drives the vehicle, a plurality of sensors, a microprocessor, and a motor controller, wherein the vehicle is capable of moving in either a forward direction or a reverse direction, wherein the plurality of sensors includes a drive selector sensor that senses a current drive-state of the vehicle corresponding to whether the vehicle is moving the forward direction or the reverse direction, a battery sensor that senses a state-of-charge of the battery, an accelerator sensor that senses a position of an accelerator pedal and a brake sensor that senses a position of a brake pedal, and wherein the motor controller controls torque output of the motor, the method comprising the steps of:

receiving signals from the plurality of sensors;

converting the signals for the plurality sensors into a torque value; and outputting the torque value to the motor controller for controlling the torque output of the motor, wherein said torque value is a negative value when said battery sensor signal indicates that the battery needs charging and said drive selector sensor signal indicates that the current drive-state is forward, and wherein said torque value is negative when said battery sensor signal indicates that the battery needs charging and said drive selector sensor signal indicates that the current drive-state is reverse.

22. The method of claim 21 wherein the converting step includes the substep of:

determining whether the signal for the battery sensor indicates that the battery does or does not need charging.

23. The method of claim 22 wherein the converting steps includes the substep of:

determining whether the signal for the drive selector sensor indicates that the current drive-state of the vehicle is in the forward or reverse direction.

24. The method of claim 23 wherein when it is determined that the signal for the battery sensor indicates that the battery does not need charging and that the current drive-state of the vehicle is the forward direction, then the torque value is a positive value.

25. The method of claim 23 wherein when it is determined that the signal for the state-of-charge indicates that the battery does not need charging and that the signal for the drive selector sensor indicates that the current drive-state of the vehicle is in the reverse direction then the torque value is a negative value.

26. The method of claim 21 further comprising:

receiving a signal from the motor controller indicating an rpm value for the motor; and converting the signal received from the motor controller into a value corresponding to a current speed of the vehicle.

27. The method of claim 26 further comprising:

outputting the value for the current speed of the vehicle.

28. The method of claim 21, wherein a diagnostic device is connectable to vehicle power controller, the method further comprising the steps of:

receiving a BIT signal from at least one of the diagnostic device and the motor controller; and processing a BIT test corresponding to the BIT signal.

29. The method of claim 28 further comprising the steps of:

outputting a result for the BIT test to at least one of the diagnostic device and the motor controller.

30. The method of claim 29 further comprising the steps of:

determining a BIT source corresponding to whether the BIT signal was received by the receiving means from the diagnostic device or the motor controller; and outputting a result for the BIT test to the BIT source.

31. A computer-implemented method for controlling propulsion of a vehicle that includes a battery, an electric motor that drives the vehicle, a plurality of analog sensors, a plurality of digital sensors, a microprocessor, and a motor controller, wherein the vehicle is capable of moving in either a forward direction or a reverse direction, wherein the plurality of analog sensors includes a battery sensor that senses a state-of-charge of the battery, an accelerator sensor that senses a position of an accelerator pedal and a brake sensor that senses a position of a brake pedal, wherein the digital sensors include a drive selector sensor that senses a current drive-state of the vehicle corresponding to whether the vehicle is moving the forward direction or the reverse direction, and wherein the motor controller controls torque output of the motor, the method comprising the steps of:

receiving signals from the plurality of analog sensors;

converting the signals for the plurality analog sensors into a plurality of digital signals;

determining a torque value using the plurality of digital signals; and outputting the torque value to the motor controller for controlling the torque output of the motor;

wherein said torque value is negative when the battery needs charging and the drive-state is forward.

32. The method of claim 31 wherein the determining step comprises:

receiving a digital drive signal from the drive selector sensor;

determining whether the battery needs charging using the digital signal corresponding to the converted signal for the battery sensor; and determining the current drive-state of the vehicle from the digital drive signal.

33. The method of claim 32 wherein when it is determined that the battery needs charging and that the current drive-state of the vehicle is in the reverse direction then the torque value is a positive value.

34. The method of claim 32 wherein the motor charges the battery when it is determined that the battery needs charging.

35. The method of claim 32 wherein when it is determined that the battery does not need charging and that the current drive-state of the vehicle is in the forward direction then the torque value is a positive value.

36. The method of claim 32 wherein when it is determined that the battery does not need charging and the current drive-state of the vehicle is in the reverse direction then the torque value is a negative value.

* * * * *